(12) United States Patent
Sood et al.

(10) Patent No.: US 10,884,814 B2
(45) Date of Patent: Jan. 5, 2021

(54) MOBILE EDGE-CLOUD SECURITY INFRASTRUCTURE

(71) Applicant: Intel Corporation, Santa Clara, CA (US)

(72) Inventors: Kapil Sood, Portland, OR (US); Patrick L. Connor, Beaverton, OR (US); Scott P. Dubal, Beaverton, OR (US); James Robert Hearn, Hillsboro, OR (US); Andrew J. Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 16/147,118

(22) Filed: Sep. 28, 2018

(65) Prior Publication Data

US 2019/0042319 A1 Feb. 7, 2019

(51) Int. Cl.
*G06F 9/50* (2006.01)
*G06F 9/455* (2018.01)
(Continued)

(52) U.S. Cl.
CPC ........ *G06F 9/5072* (2013.01); *G06F 9/45558* (2013.01); *G06F 12/145* (2013.01); *G06F 12/1408* (2013.01); *G06F 21/53* (2013.01); *G06F 21/74* (2013.01); *H04L 9/0861* (2013.01); *H04L 9/0894* (2013.01); *H04W 12/08* (2013.01);
(Continued)

(58) Field of Classification Search
None
See application file for complete search history.

(56) References Cited

U.S. PATENT DOCUMENTS

2010/0031370 A1* 2/2010 Ellison .................... G06F 21/57
726/27
2017/0078434 A1* 3/2017 Radhakrishnan ... H04L 67/2842
(Continued)

FOREIGN PATENT DOCUMENTS

DE 102019121364 A1 4/2020

OTHER PUBLICATIONS

"ETSI GS NFV-SEC 009 V1.1.1 Network Functions Virtualisation (NFV);", NFV Security; Report on use cases and technical approaches for multi-layer host administration, (Dec. 2015), 49 pgs.
(Continued)

*Primary Examiner* — Tuan C Dao
*Assistant Examiner* — William C Wood
(74) *Attorney, Agent, or Firm* — Schwegman Lundberg & Woessner, P.A.

(57) ABSTRACT

System and techniques for multifactor intelligent agent control are described herein. A workload request may be received from a user device via a network. The workload may be instantiated in an isolated environment on an edge computing platform. Here, the isolated environment may be a container or a virtual machine. The instantiation of the workload may include using a hardware security component (SEC) of the mobile edge computing platform to prevent access to data or code of the workload from other environments hosted by the mobile edge computing platform. The workload may then be executed in the isolated environment and a result of the workload returned to the user device.

24 Claims, 8 Drawing Sheets

(51) Int. Cl.
*G06F 21/53* (2013.01)
*G06F 12/14* (2006.01)
*H04L 9/08* (2006.01)
*H04W 12/08* (2009.01)
*G06F 21/74* (2013.01)
*G06T 19/00* (2011.01)
*H04L 29/06* (2006.01)
*H04W 12/02* (2009.01)

(52) U.S. Cl.
CPC .............. *G06F 2009/45562* (2013.01); *G06F 2009/45587* (2013.01); *G06F 2221/2149* (2013.01); *G06T 19/006* (2013.01); *H04L 63/0428* (2013.01); *H04L 2209/80* (2013.01); *H04W 12/02* (2013.01)

(56) References Cited

U.S. PATENT DOCUMENTS

| 2017/0251368 | A1* | 8/2017 | Ross | H04W 12/004 |
| 2019/0182333 | A1* | 6/2019 | Bartfai-Walcott | H04L 67/125 |
| 2020/0077124 | A1* | 3/2020 | Shi | H04N 21/222 |

OTHER PUBLICATIONS

"ETSI GS NFV-SEC 012 V3.1.1 Network Functions Virtualisation (NFV)", Release 3; Security; System architecture specification for execution of sensitive NFV components, (Jan. 2017), 17 pgs.

Moorhead, Patrick, "FacebookF8 Day 2: 10 Year Roadmap for VR/AR, Wireless, Brain Interfaces and Open-Sourced AI", https://www.forbes.com/sites/patrickmoorhead/2017/04/20/facebook-f8-day-2-recap-10-year-roadmap-for-vr-comms-brain-interfaces-and-open-sourced-ai/#4b3df30e150c Accessed on Oct. 3, 2018, (Apr. 20, 2017), 9 pgs.

* cited by examiner

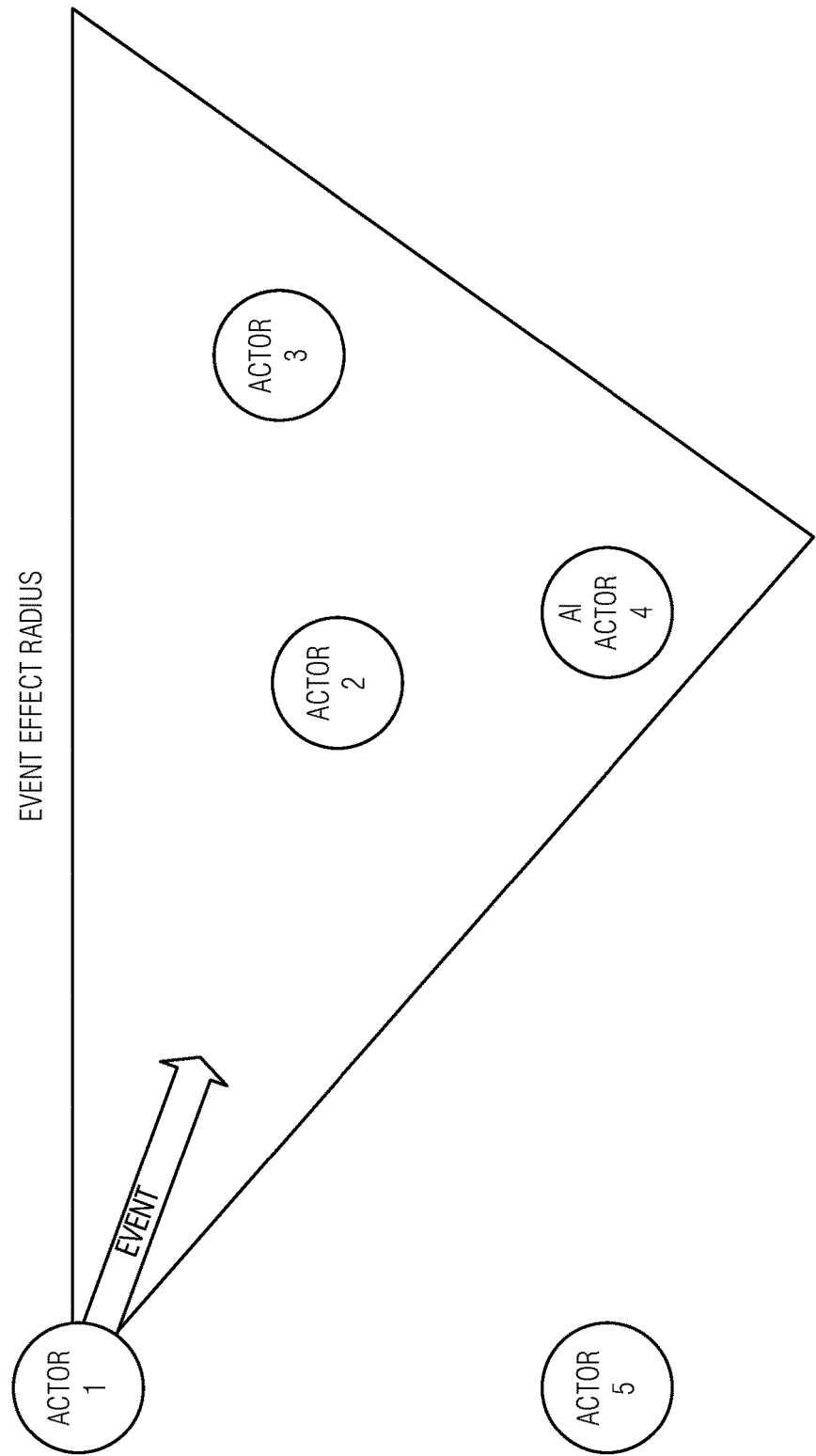

MOBILE EDGE-CLOUD SECURITY INFRASTRUCTURE

TECHNICAL FIELD

Embodiments described herein generally relate to computer security hardware and more specifically to a mobile edge-cloud security infrastructure.

BACKGROUND

Augmented reality (AR) and virtual reality (VR) devices and applications are becoming more common. These applications generally involve significant data transfer and processing. Thus, as AR and VR use become more common, network demand may continue to increase to provide the data or to use off-device processing (e.g., using cloud services to perform object classification). In some cases, devices, such as mobile devices, may place great network demand on the network facilities (e.g., evolved packet core (EPC)) services, virtual EPC (vEPC), or network function virtualization (NFV) services of wireless providers. This traffic may be in addition to Fifth Generation wireless (5G) and Mobile Edge Computing/Multi-Access Edge Computing (MEC) enabled applications, such as sensor data sharing, video transcoding, audio, image, or video classification (e.g., recognition), among other things.

Many 5G or MEC-enabled use cases involve numerous devices (e.g., hundreds, thousands, or even millions of devices) simultaneously generating huge amounts of traffic (e.g., hundreds of gigabytes or more). In these cases, wired or wireless backhauling of that traffic to the EPC may be very costly for wireless carriers. Further, as available network resources are consumed, network latency may increase, putting at risk latency margins (e.g., a maximum latency tolerable by the application to meet design criteria, user experience requirements, etc.) for a variety of applications.

An edge-cloud architecture may be employed to alleviate some of the network backhaul issues noted above. Generally, an edge-cloud is a collection of hardware, which may be spread across several devices within a local environment, to perform functions traditionally placed in the cloud. Edge-cloud platforms may include an abstraction layer to interact with client workloads in the same manner that cloud services interact with those workloads. This may ease or eliminate burdens on application developers to design applications compatible with both cloud and edge services. Thus, developers may not have to provide for any difference between edge and cloud services, enable carriers to move cloud functions to the edge for any application and alleviate network backhaul congestion.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates an example of a simulated or augmented world with multiple actors, according to an embodiment.

DETAILED DESCRIPTION

Figure 1:
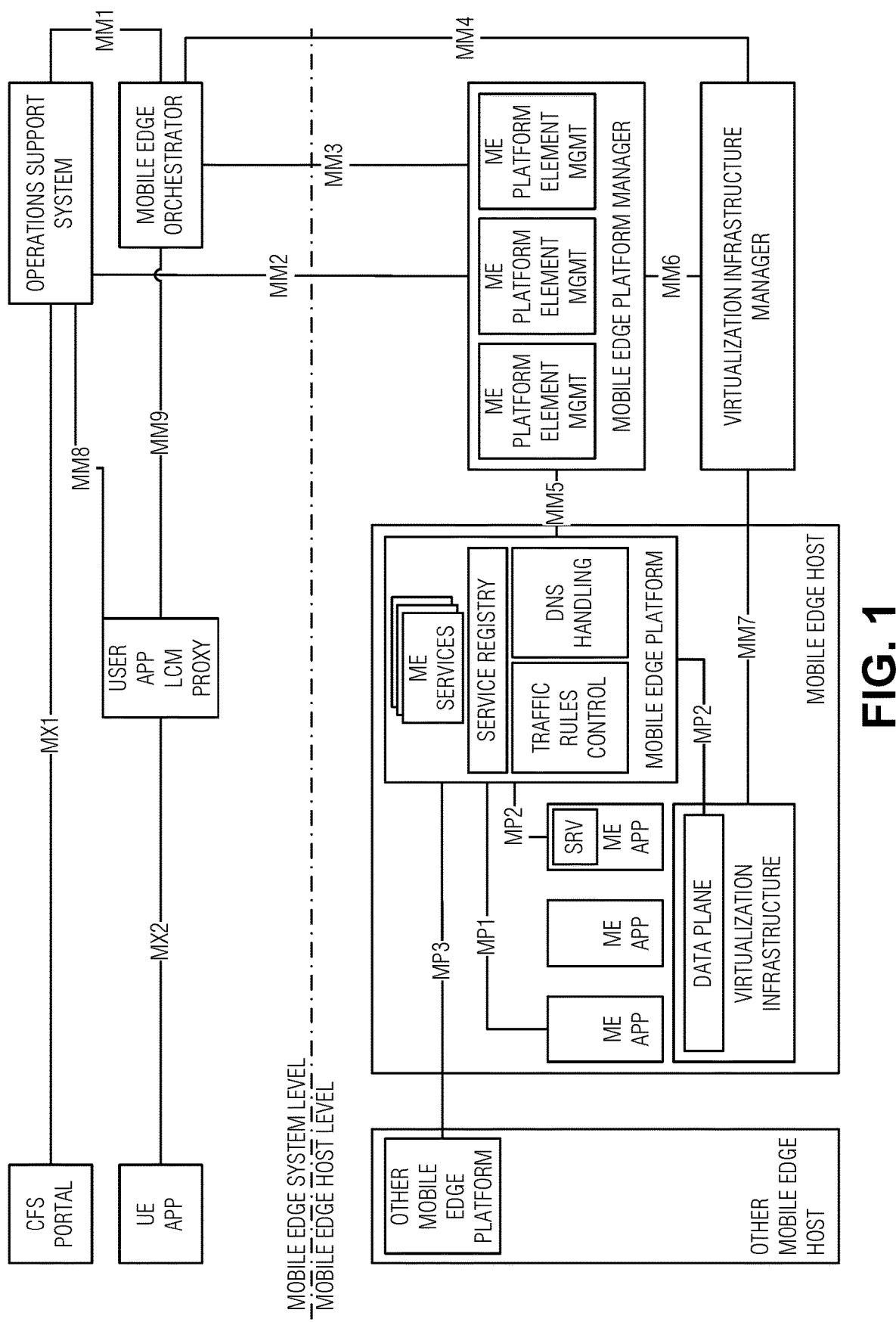
FIG. 1 is a block diagram of an example of a MEC architecture, according to an embodiment.

Security is a complex issue for those who develop, deploy, or operate applications. Using edge-cloud resources increases this complexity. Previously, developers generally controlled the endpoints (e.g., client and server) of applications that use cloud services. With edge-cloud deployments, even if the platform operator (e.g., a wireless network carrier, or internet service provider) is trusted by an application operator, several non-trusted applications may be running alongside the application. That is, in edge-cloud deployments—including systems and techniques that deliver geo-location based or content-driven delivery of services on general purpose hardware—the hardware may be running multiple, heterogeneous workloads (e.g., applications, vEPC, packet processing applications, etc.) in mixed combinations of multiple security domains (e.g., tenants, or infrastructure). To maintain the security that developers have come to expect from cloud platforms, the edge-cloud needs to securely separate these workloads from each other.

Consider the following scenario for an application—such as an AR video game in which players use a mobile phone to hunt and capture virtual creatures in the real-world, or autonomous self-driving vehicles, etc.—using a MEC-based combination of services to deliver superior, cost efficient services to their customers than without using an edge-cloud. In the case of the game, a geo-location-based map used to store the creature locations in the real-world may involve caching localized geo-location data at various MECs. The player's geo-location may be correlated to MEC deployments with caches for that geo-location, the caches including such data values as map data, awards for gameplay, etc. The geo-location-specific data of the MEC deployment may also include such data as real-time traffic or weather information, local points-of-interest (e.g., parks, restrooms, shops, etc.). Some of this information may be highly sensitive, including information that is used to geographically locate the player (e.g., user), financial information of the player or business (e.g., in the case of in-game purchases, order food from a local restaurant, etc.), or passwords and the like. For developers, sensitive information beyond customer information may also be at stake. For example, voice or image recognition applications running in the edge-cloud may be very important to the success of the application developer and application deployment.

Capabilities are needed in a trusted, secure, general purpose infrastructure at the edge that may be integrated seamlessly with NFV services (e.g. virtual network function (VNF) based service function chains), and third-party applications (e.g., games, navigation, pattern recognition, control systems, etc.). Although some virtualization technologies, such as containers and virtual machines (VMs), have been employed to provide some execution and data separation on multi-tenant systems, such technologies may still have security vulnerabilities (e.g., unencrypted data in memory may be retrieved by unauthorized entities) and inefficiencies due to the software-based virtualization. To address these issues, hardware facilities to support efficient multi-tenant workload security are integrated into edge-cloud platforms. These facilities may take several forms, including a security component (SEC)—such as a trusted execution environment (TEE), hardware security module (HSM), software guard extension (SGX), trusted platform module (TPM), or the like—arranged to store keys of tenants to perform encryption of data in memory (e.g., random access memory (RAM) or the like maintain current system state), in storage (e.g., hard drive, solid state drive (SSD), storage class memory, etc., storage, or the like maintain saved state and data that is generally loaded into memory prior to use by processing circuitry), or on an interlink (e.g., bus). Virtualization extensions may be employed to coordinate tenant workload execution by containers or VMs in a secure manner supported by the SEC. Thus, described herein are devices, systems, and techniques for delivering secure, geo-location-based and content-driven delivery of services (e.g., via an edge-cloud platform) on general purpose hardware that may run multiple, heterogeneous workloads (applications, vEPC, packet processing applications, etc.) in mixed combinations of multiple security domains (tenants or infrastructure) securely separated from each other. Additional examples and details are provided below.

FIG. 1 is a block diagram of an example of a MEC architecture, according to an embodiment. This architecture is based on a proposed edge-cloud configuration from the European Telecommunications Standards Institute (ETSI) MEC industry consortium. The architecture illustrates a separation between host services (below the dashed line) and system services (above the dashed line). The labeled solid lines are ETSI MEC-defined message interfaces between the various illustrated components.

While tenant workloads (e.g., from the user equipment (UE) application (app) originate at the higher services level, the mobile edge host (e.g., edge computing platform, mobile edge platform, etc.) is employed to execute at least a portion of the workload—and other portions may be executed by other mobile edge hosts depending on the operations of the mobile edge orchestrator or the mobile edge platform manager. On the mobile edge host, the portion of the workload is performed by a mobile edge app (ME app). Access to hardware, such as processors, the network, storage, etc., is managed through the mobile edge platform to facilitate host security and stability. The hardware-supported platform security described above is explained in the context of this architecture, though the concepts may be applied to other architectures in which multiple tenant workloads are executed on a single hardware platform.

Mobile edge hosts may be implemented as in rack blades, servers, or the like in, for example, a datacenter co-located with a base station of a wireless provider. In an example, the mobile edge host may be included in a network gateway, router, switch, or other network device. Thus, for example, in a wired network scenario, such as with cable or phone-line services providers, the mobile edge host may reside in wired network hardware to provide seamless edge efficiency to client user devices.

Figure 2:
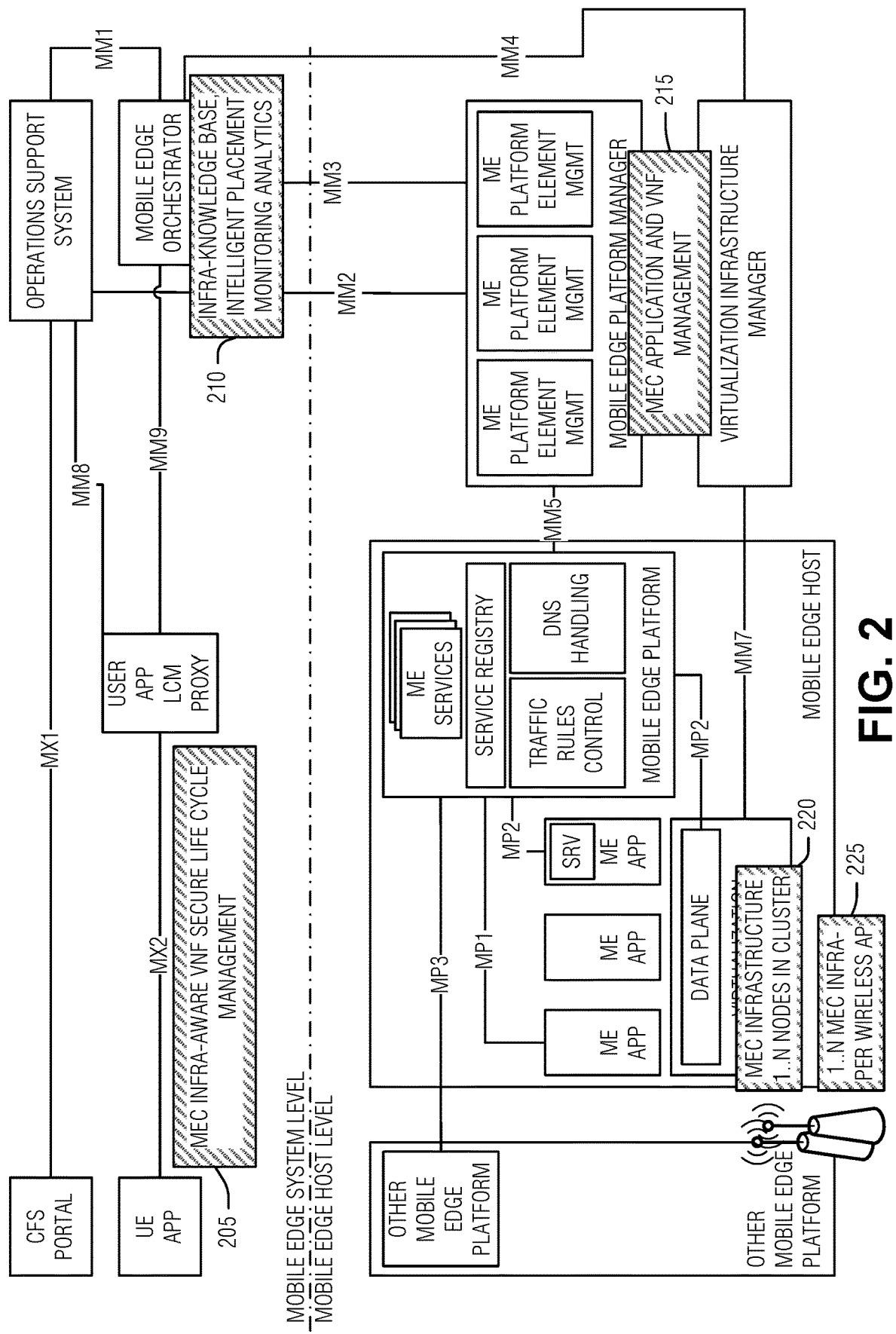
FIG. 2 illustrates a block diagram of an example of components to secure AR or VR in a MEC architecture, according to an embodiment.

FIG. 2 illustrates a block diagram of an example of components to secure AR or VR in a MEC architecture, according to an embodiment. The shaded components illustrate some example changes to the architecture illustrated above in FIG. 2. As noted above, a workload begins with a request by a UE app. The request may be modified from traditional MX2 requests by including an infrastructure-aware VNF lifecycle data structure 205. This data structure 205 may include fields that designate, for example: sensitive data (e.g., personal information of the user, proprietary data, etc.); sensitive code (e.g., algorithms, programs, etc.); a sensitivity level of these elements; identification of the user, the application, a publisher of the application, a deployer of the application, etc.; security keys; or other information that may be used by the mobile edge orchestrator, the mobile edge platform manager, virtualization infrastructure, or the mobile edge host to secure the workload. In an example, the data structure 205 includes data handling directives, such as data retention, or required audit logs. These may be required or important when, for example, data handling is regulated by a governmental agency, insurer, or the like.

An infrastructure knowledge base 210 may be employed at the mobile edge orchestrator, or network appliance between the mobile edge orchestrator and the mobile edge platform manager of virtualization infrastructure manager, to enable analytics on the workload. Such analytics may include comparing actual latencies with expected latencies, testing communications security, etc. The analytics are based on the knowledge base 210 to avoid false indications of security or performance measurements based on a misunderstanding of the underlying architecture. Further, the analytics may be informed by the data structure 205, and the data therein specifying specific parameters or expectations for the workload.

MEC application and VNF manager 215 is arranged to coordinate the virtualization infrastructure manager with the mobile edge platform manager to ensure that attacks cannot be levied, for example, at the mobile edge platform manager via the virtualization infrastructure manager. Such attacks may include, for example, the redirection of a workload to an untrusted mobile edge host, or a man-in-the-middle style capture of data if, for example, the data is decrypted by the mobile edge platform manager for allocation to a mobile edge host. The MEC application and VNF manager 215 may use the security information in the data structure 205 to both ensure security of protected information, as well as determine what information of the workload should be protected. Recognizing when to avoid performing security functions may increase efficiency and throughput when it is not necessary.

Cluster separator 220 is arranged to provide hardware facilitated workload separation of the ME apps. Implemented in a SEC, the cluster separator 220 may provide facilities such as platform and workload or tenant-specific key generation to encrypt memory used by the ME app. In an example, a tenant provided key may be used for encryption or attestation. The cluster separator 220 may be integrated into an interlink to provide seamless encryption and decryption of all information flowing into and out of the processing circuitry, ensuring that attacks against the hardware itself (e.g., the memory or storage) may result only in cyphertext (e.g., encrypted data).

The cluster separator 220 may modify its actions based on the data structure 205 or based on directives from the MEC application and VNF manager 215. The modified actions may include avoiding encryption on data that is not sensitive (e.g., only encrypting data marked sensitive by the data structure 205), encrypting only data communicated from the ME app (e.g., not in memory or storage), or the like. Again, judicious application of security only where it is needed may result in increased performance of the mobile edge host.

Network infrastructure circuitry 225 may provide additional security on, for example, different wireless interfaces of the mobile edge host. In contrast to the standard wireless security protocols employed by wireless carriers, the Network infrastructure circuitry 225 may add tenant-specific facilities to further secure communications, from, for example, the wireless carriers themselves. This may add an additional level of trust, enabling even the most sensitive workloads to be distributed to the mobile edge host.

The elements of this architecture described above enable a mixed, heterogeneous combination of tenant VMs—e.g., AR or VR VNFs running alongside others with isolation, and trusted access to infrastructure services, such as secure geo-location to run with multi-domain separation enforced by the SEC hardware. Secure access to these NFV infrastructure (NFVI) capabilities is provided to VNF and third-party applications (e.g., tenant) VMs.

The mobile edge host or set of hosts (e.g., in a rack-organized pod of hardware with individual hosts connected, for example, by a high-speed switch that may also include a hardware queue manager (HQM) for hardware accelerated inter-machine communications) may deliver secure location-based services to 5G UEs or other end-units. The provider's VNFs, such as EPC or vEPC, may calculate and deliver, for example, geo-location or other data, to the UE app. The UE app may request the mobile edge orchestrator to deploy specific application VMs to the appropriate mobile edge host, for example, via the data structure 205.

The vEPC packet data network gateway (PGW) (e.g., the infrastructure knowledge base 210) may detect workload flows (e.g., service level agreements, trusted platform requirements, etc.) direct them to the SEC (e.g., SGX TEE, converged security management engine (CSME), or VM-trusted management engine (TME)) for processing and fulfillment. In an example, the SEC may use secure attestation by the tenants of the mobile edge platform to run their algorithms and logic in protected partitions. In an example, the SEC generates a secret key (e.g., a hardware generated secret key as in SGX Sealing Key, or CSME secret keys) to encrypt data (e.g., credit cards, privacy protection, transaction security, etc.).

The NFVI (e.g., the MEC application and VNF manager 215) may allocate storage to application specific VMs in order to deliver applications. The protected partitions and non-protected partitions may use the storage to hold transactions, including those to be utilized for secure transaction blockchains, as long-lived components. In an example, various AR or VR application components (e.g., user data, geo-maps, co-player geo maps, etc.) may be saved in the storage with VNF or VM specific secret keys.

The NFVI may deliver secure clock and timestamp facilities to the carrier VNFs or the application specific VMs. This may be done using the SEC and may flow from the mobile edge host to the central NFV Orchestration system (e.g., mobile edge orchestrator) for logging and monitoring. In addition, the secure Timestamps may be used for edge payment or for sequencing AR or VR transactions.

In ultra-high availability scenarios, where the services cannot be disrupted—such as internet-of-things (IoT) Emergency Services, vehicle-to-vehicle (V2V), or some VR or AR applications—the mobile edge platform manager (e.g., ETSI NFV defined virtual network function module (VNFM)) may initiate a VM or VNF migration from the central datacenter to the edge. In an example, the migration may be to multiple edge-platform clusters for reasons of high-availability (HA) or redundancy.

In scenarios where users are interacting in close physical proximity (e.g., between vehicles next to each other on the road), then they may need the lowest latency possible. Here, rather than migrate workloads to the central datacenter, new service VMs may be instantiated at the edge to deliver the geo-specific VMs closest to the users. This may be accomplished using 5G subscriber location or the location of the MEC platform—e.g., via UE, mobile, or IoT device registration location information—to deliver the applicable AR or VR VMs, or vEPC or vMEC components at the edge hosts closest to those devices.

Figure 3A:
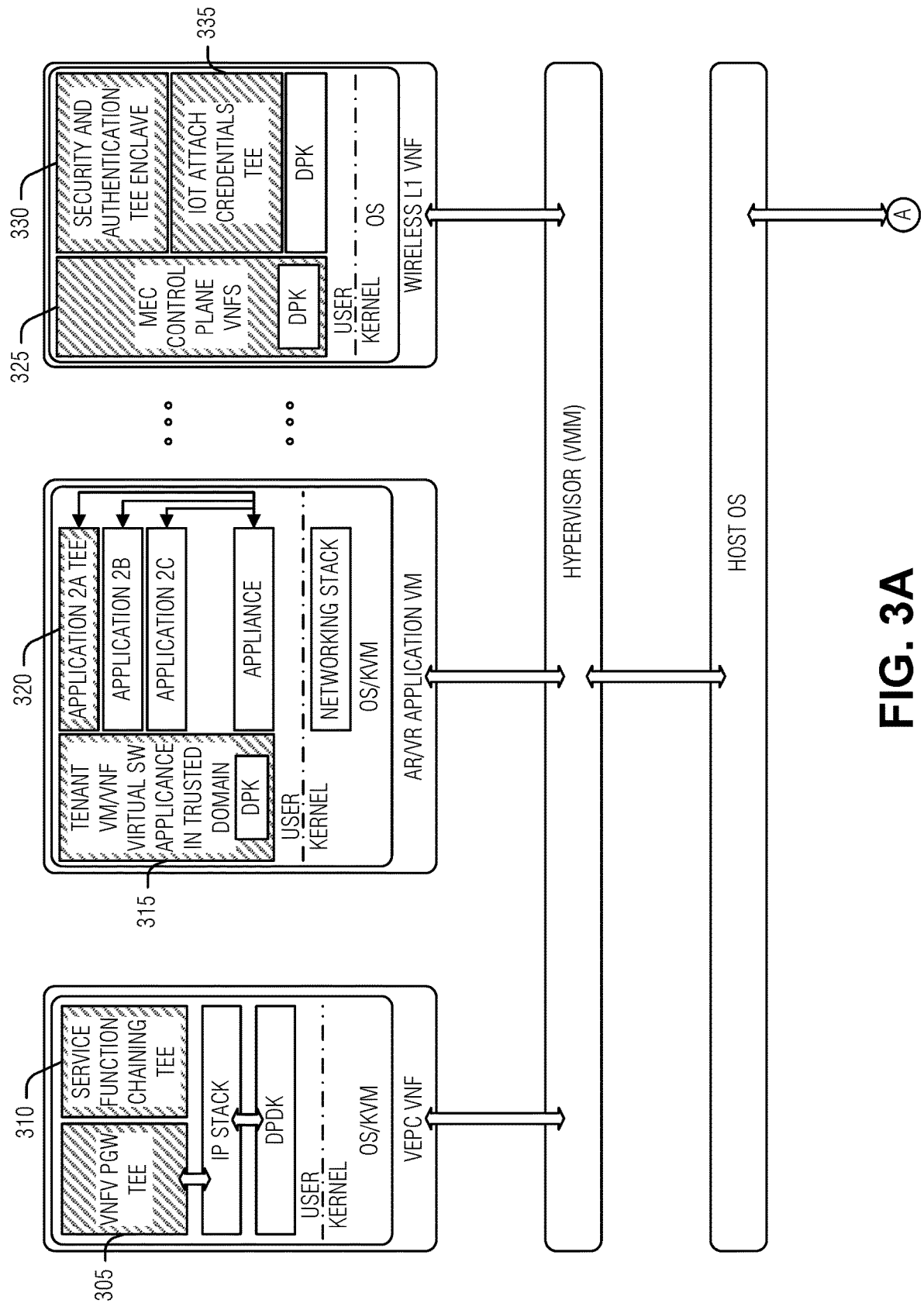
FIGS. 3A and 3B illustrate an example of a MEC wireless node architecture, according to an embodiment.
Figure 3B:
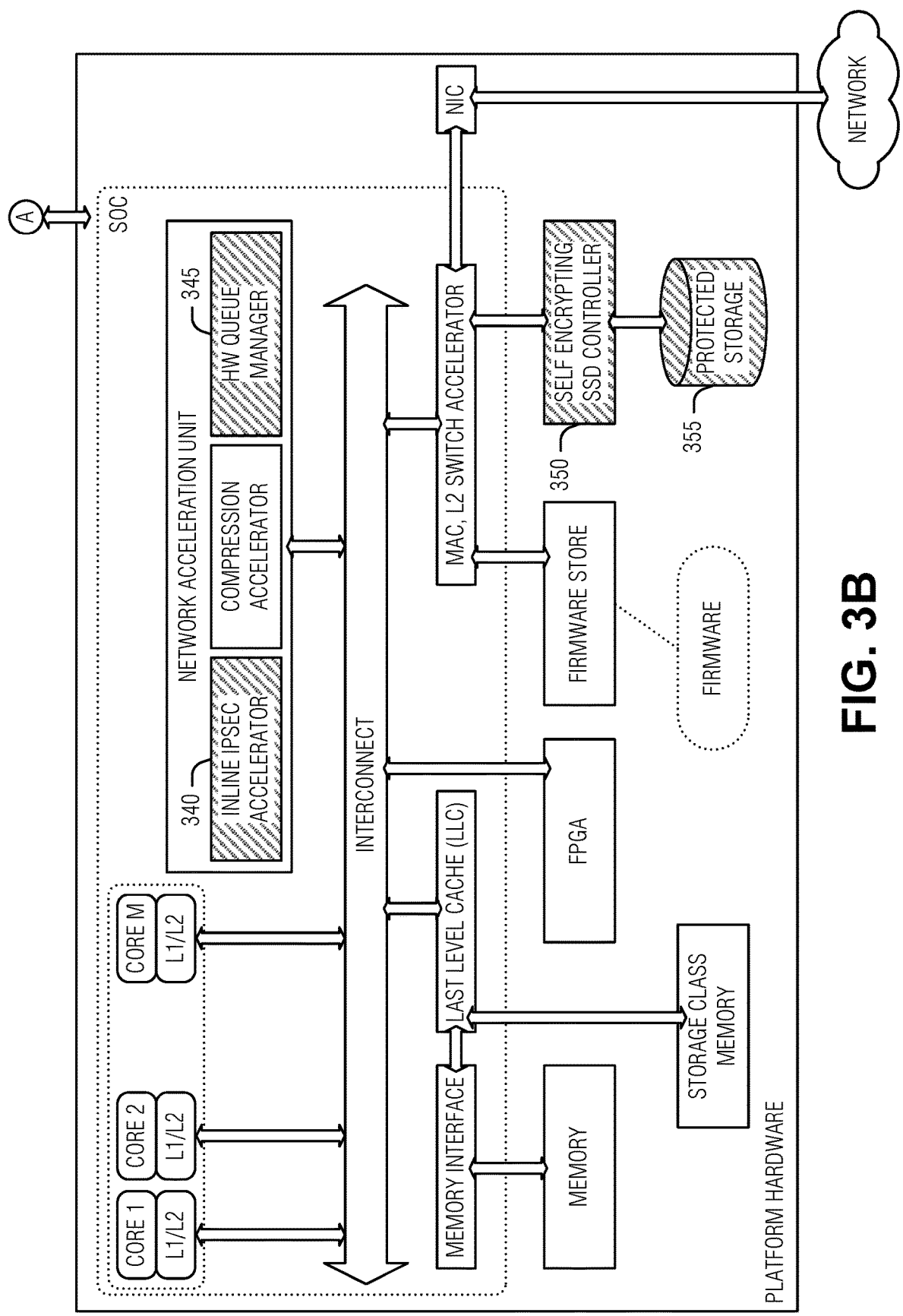

FIGS. 3A and 3B illustrate an example of a MEC wireless node architecture, according to an embodiment. As with FIG. 2, the modifications to the illustrated architecture to support a mobile-edge cloud security infrastructure are shaded. FIG. 3A illustrates containers and VMs connected via a hypervisor to a host OS. In an example, the hypervisor is absent, the hardware multiplexing or isolation being handled by SEC hardware of the device illustrated in FIG. 3B. The host OS interfaces with the hardware platform in FIG. 3B to implement the container or VMs upon which the workloads are run. As illustrated, the VNFs to the left and the right of the diagram implement carrier functions, such as a gateway 305 and MEC control 325 respectively. The gateway 305, service orchestration 310, MEC control plane 325, security handling 330, and IoT credentialing 335 are supported by SEC (e.g., TEE) hardware of the platform hardware.

The UE application workload is illustrated on a VM, although a container may also be used, in which VM resource isolation is ensured by trusted domain hardware 315 of the platform hardware. Such trusted domain hardware 315 may use encryption to isolate the domain data when the data resides in cache, memory, or storage (e.g., the protected storage 355). Further, techniques such as virtual memory mapping may be employed to increase isolation between VMs or containers. A secure application 320 may be supported by the SEC (e.g., TEE) whereas the other applications (e.g., Application 2B and 2C) are not.

On the platform hardware illustrated in FIG. 3B, a virtual switch acceleration complex comprising various network functions may be used. For example, the complex may include an inline internet protocol security (IPSEC) accelerator 340 or a hardware queue manager 345. The former may provide enhanced efficiencies in securing tenant network traffic and the latter may accelerate inter-device communications within a rack in a carrier edge-facility (e.g., co-located with an enhanced nodeB or the like, and implementing single-root input/output virtualization (SR-IOV) loop-back and switching acceleration). The complex may also include an inline compression accelerator, or decoders for AR or VR media streams.

The storage class memory, or the protected storage 355, may store locality data that may be used across multiple tenants (e.g., subscribers). The locality data may include navigation or game street information, textures, AR or VR video scenarios, and the like. Storage security may also be facilitated by the storage controller 350, which may provide security when, for example, the storage itself does not. As noted above, the security may be workload based, not only preventing loss of data if the hardware is attacked directly (e.g., the storage 355 is removed and read), but also in instances in which storage is inadvertently delivered to another workload.

In an example, a hardware-based root of trust may be used for every VNF or VM. In an example, the root of trust is employed with operationally sensitive VNFs, the hardware platform here providing unique hardware key-based memory encryption, integrity and replay protection, among other services.

In an example, specialized hardware may be employed based on the workload. For example, if an application has specialized compute needs, such as a dynamic composition of screens, composition layering, etc., the hardware platform may use the FPGA. Here, the FPGA may be considered a service (e.g., hardware as a service (HaaS)) and secured using the SEC.

The hardware platform may be implemented in several different form factors. For example, the MEC/5G Infra-platform may be a complete system platform. In some cases, these platform components may be delivered as discrete dynamic add-in form-factors (e.g. cards, sledges, etc.) to any system performing baseline control plane functions. In addition, this may be delivered in a "composable" platform with independent scaling of cores, system-on-chips (SoCs), storage class memory (e.g., memristor memory or other byte addressable storage system with response times sufficient to be used directly by processing circuitry to execute application), network interface controllers (NICs), etc.

In an example, these system configurations may have tamper detection, tamper resistant, or wipe-on tampering (e.g., erase the data when tampering is detected) capabilities. These features guard against accidental or malicious exposure of sensitive data and code. The SGX enclaves or CSME may provide the tamper detection or the wipe-on tamper functions, including erasing secret keys used for storing VNF, VM, or container payment data, and may also change memory encryption keys upon tamper detection.

In an example, when multiple users are using same application (e.g., executing, shared data and content may be stored locally instead of every device using the central cloud. An advantage of edge-cloud architecture involves storing the same data for several users at the edge (e.g., in a base station) while shaping the data for optimal delivery to each receiver. The illustrated mobile-edge system maintains detailed information about the connection quality and type to provide this custom delivery of data. The base station may provide information of the content to be delivered, the device it may be presented upon, or the connection. This information may include jitter tolerance, buffering capabilities, network speed or throughput, screen resolution, audio fidelity, service plan, payment status, terms of service, quality of service (QoS), and more. Using some or all of this data, the mobile edge platform may transcode the data for optimal delivery to the receiving (e.g., displaying, presenting, etc.) device. For example, smaller screens may be sent lower resolution content, or lower bandwidth connections may receive content with higher levels of compression.

Figure 5:
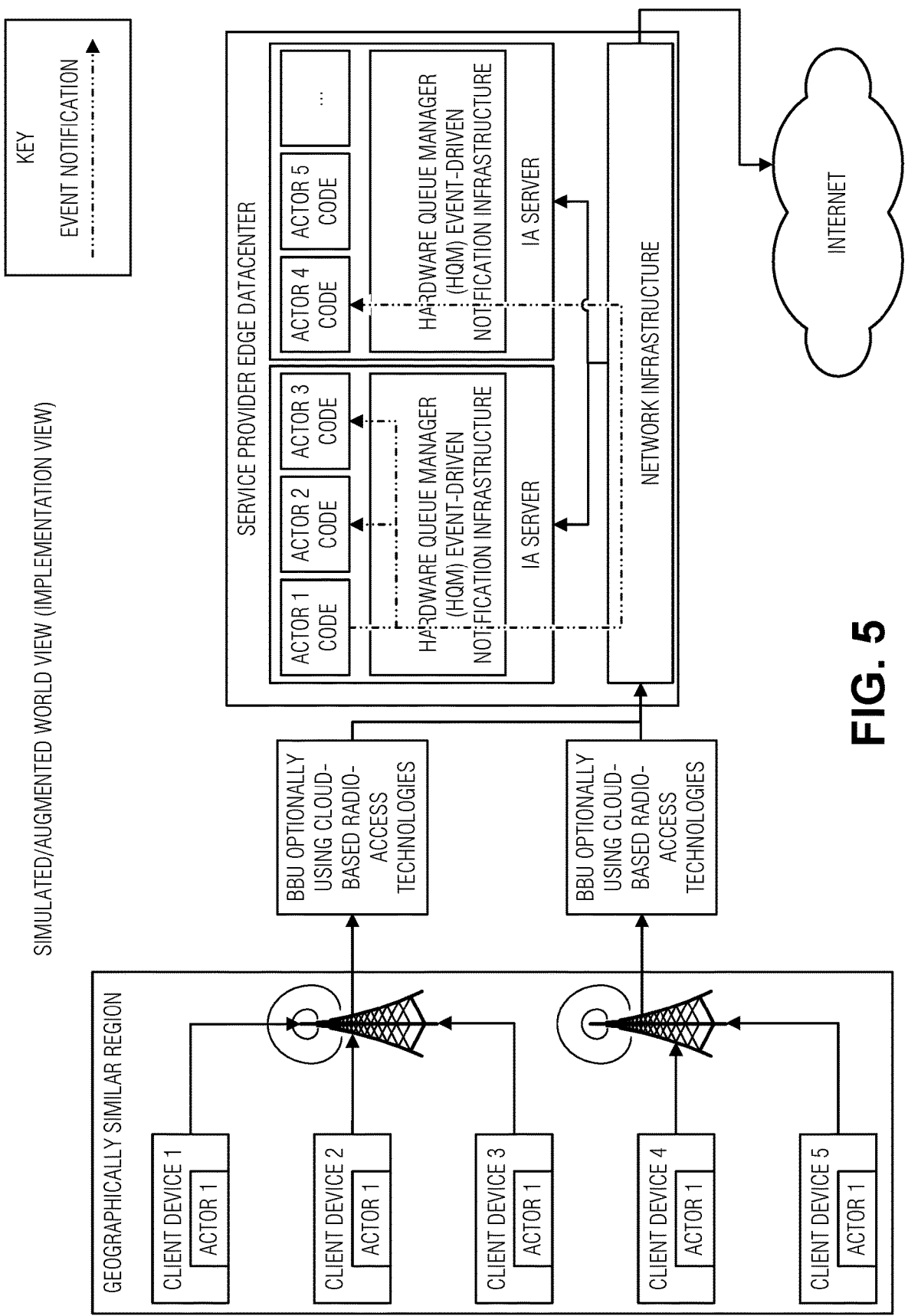
FIG. 5 illustrates an example of a computer implementation of a simulated or augmented world with multiple actors, according to an embodiment.

FIG. 4 illustrates an example of a simulated or augmented world with multiple actors, according to an embodiment. An example of how the capabilities of the devices illustrated in FIGS. 2-3B may be used is illustrated in FIGS. 4 and 5. For example, consider a simulated or AR world in which multiple actors are present in a given area. Actor 1 causes an event which affects actors 2, 3, and 4, where some actors could be either other players or artificial intelligence elements. To provide notification to the actors 2-4 that the event affects them, the effect radius of a particular event may be computed and sent to devices hosting those actors (e.g., Actors 2-4 receive notifications because they are within the event effect radius (here illustrated as a triangle), but Actor 5 is not sent a notification because it is outside of the event effect radius.

FIG. 5 illustrates an example of a computer implementation of a simulated or augmented world with multiple actors, according to an embodiment. Given the example of FIG. 4, the event impact processing (e.g., computing the event effect radius or providing the appropriate notifications) is moved to the edge (e.g., hardware servicing the geographic region of Actor 1). UEs communicate through wireless infrastructure to the service provider's co-located datacenter where the simulated/augmented service is hosted.

In the case of the event notification, the actors may be notified of the action affecting them using a hardware queue manager (HQM) in the datacenter servers at the edge. The software may be structured, for example, to use point-to-point notification queues through the HQM. Here, an enqueue to the HQM may include publishing an event, where the actors periodically check their incoming event queues and react accordingly. In an example, a one-to-N broadcast may be used to deliver messages to all of the actors at once.

Figure 6:
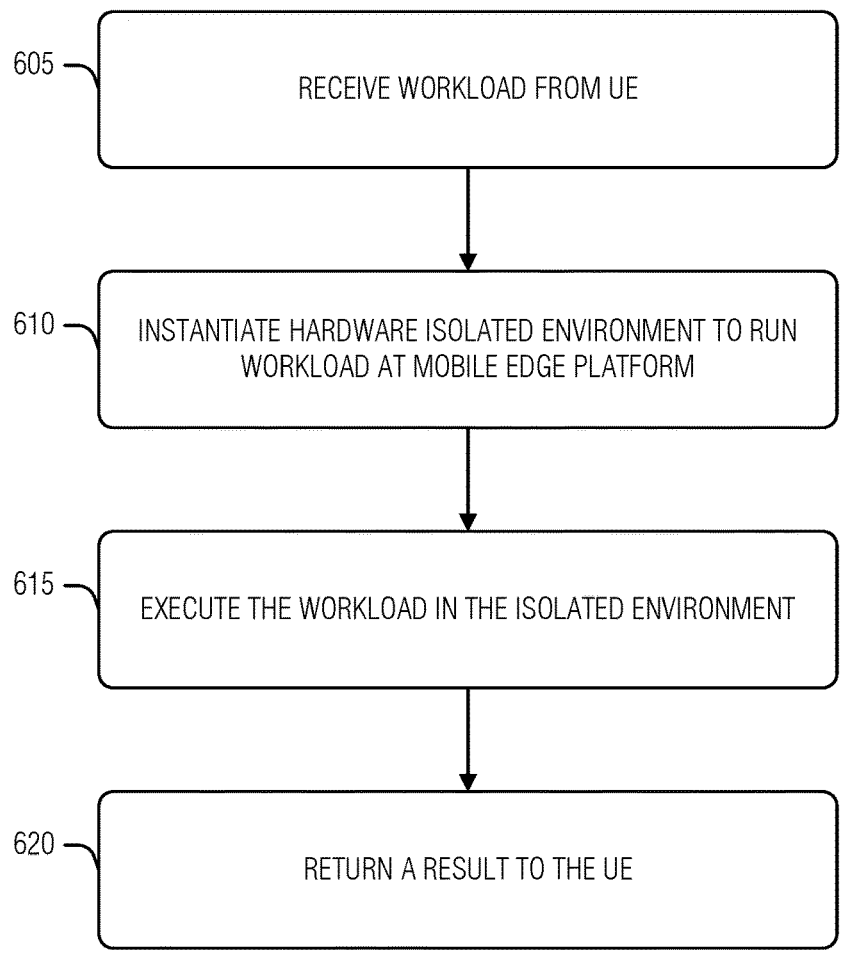
FIG. 6 illustrates a flow diagram of an example of a method for multi-factor intelligent agent control, according to an embodiment.

FIG. 6 illustrates a flow diagram of an example of a method for multi-factor intelligent agent control, according to an embodiment. The operations of the method 600 are performed by computer hardware, such as that described above or below.

At operation 605, a workload request is received from a user device (e.g., UE, tablet computer, vehicle computer, appliance, sensor, industrial or other controller, home automation device, etc.) at a mobile edge platform via a network. In an example, the mobile edge platform conforms to a MEC architecture, such as that illustrated above at FIG. 2 or FIGS. 3A and 3B. In an example, the workload supports an augmented reality or virtual reality (AR/VR) application of the user device. For example, the workload may include object recognition to determine surfaces to place a virtual object, virtual game character locations within a map, navigation directions, etc.

In an example, the workload request is routed to the mobile edge platform via a mobile edge orchestrator. Here, routing the workload to this particular mobile edge platform may be based on a communications proximity of the user device and the mobile edge platform. In an example, the communications proximity is a wireless coverage of the user device by a transceiver co-located with the mobile edge platform.

At operation 610, the workload may be instantiated in an isolated environment on the mobile edge platform. In an example, the isolated environment is a container or a virtual machine. In an example, instantiating the workload in the isolated environment includes using a hardware security component (SEC) of the mobile edge platform to prevent access to data or code of the workload from other environments hosted by the mobile edge platform. In an example, the SEC is a TEE, and HSM, an SGX, a CSME, or a TPM. In an example, to prevent access to the data or code, the SEC uses virtual memory mapping to prevent memory access between isolated environments.

In an example, to prevent access to the data or code, the SEC encrypts data before storing it in memory or a storage device of the mobile edge platform. In an example, the SEC directs a controller of the storage device to encrypt the data. In an example, the SEC generates a workload specific key as part of the instantiation of the isolated environment. In an example, the workload specific key is used for encryption of the data.

At operation 615, the workload is executed in the isolated environment.

At operation 620, a result of the workload is returned to the user device. In an example, the result is an indication that the workload was successfully completed. This is useful when, for example, the workload involves operating on external entities, such as storing content, rather than producing an answer to a query.

Figure 7:
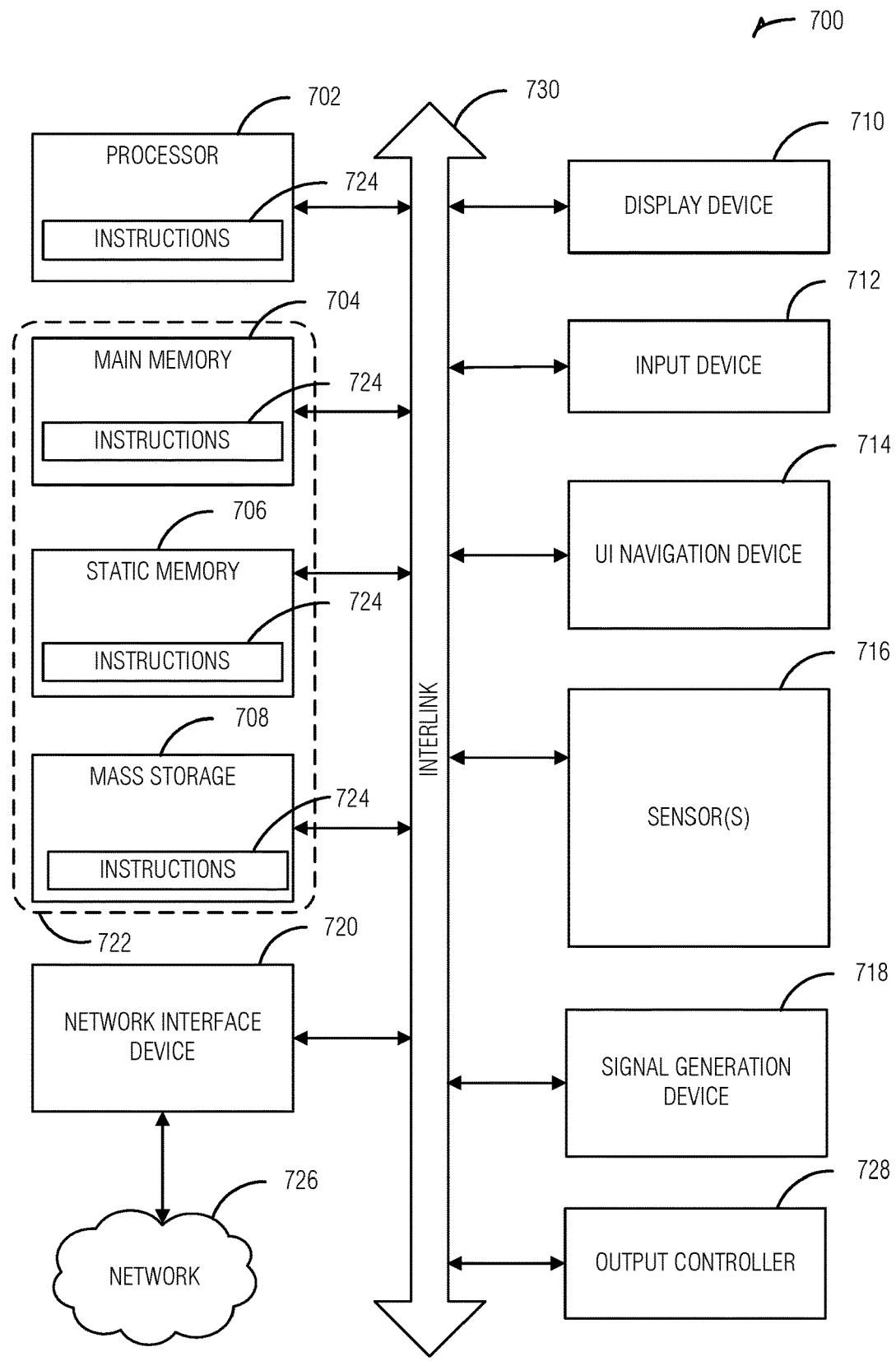
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Third Generation Partnership (3GPP) 3G, long-term-evolution (LTE), or 5G families of standards, Institute of Electrical and Electronics Engineers (IEEE) 802.11 family of standards known as Wi-Fi®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Additional Notes & Examples

Example 1 is a device for mobile edge-cloud security, the device comprising: a hardware security component (SEC); a memory including instructions; and processing circuitry that, when in operation, is configured by the instructions to: receive a workload request from a user device via a network; instantiate the workload in an isolated environment on an edge computing platform, the isolated environment being a container or a virtual machine, the instantiation using the SEC to prevent access to data or code of the workload from other environments hosted by the mobile edge computing platform; execute the workload in the isolated environment; and return a result of the workload to the user device.

In Example 2, the subject matter of Example 1, wherein, to prevent access to the data or code, the SEC encrypts data before storing it in memory or a storage device of the mobile edge computing platform.

In Example 3, the subject matter of Example 2, wherein the SEC directs a controller of the storage device to encrypt the data.

In Example 4, the subject matter of any of Examples 2-3, wherein the SEC generates a workload specific key as part of the instantiation of the isolated environment, wherein the workload specific key is used for encryption of the data.

In Example 5, the subject matter of any of Examples 1-4, wherein, to prevent access to the data or code, the SEC uses virtual memory mapping to prevent memory access between isolated environments.

In Example 6, the subject matter of any of Examples 1-5, wherein the mobile edge computing platform conforms to a multi-access edge computing (MEC) architecture.

In Example 7, the subject matter of any of Examples 1-6, wherein the workload supports an augmented reality or virtual reality (AR/VR) application of the user device.

In Example 8, the subject matter of any of Examples 1-7, wherein the workload request is routed to the mobile edge platform via a mobile edge orchestrator, the route based on a communications proximity of the user device and the mobile edge platform.

In Example 9, the subject matter of Example 8, wherein the communications proximity corresponds to a wireless coverage of the user device by a transceiver co-located with the mobile edge platform.

Example 10 is a method for mobile edge-cloud security, the method comprising: receiving a workload request from a user device via a network; instantiating the workload in an isolated environment on an edge computing platform, the isolated environment being a container or a virtual machine, the instantiating including using a hardware security component (SEC) of the mobile edge computing platform to prevent access to data or code of the workload from other environments hosted by the mobile edge computing platform; executing the workload in the isolated environment; and returning a result of the workload to the user device.

In Example 11, the subject matter of Example 10, wherein, to prevent access to the data or code, the SEC encrypts data before storing it in memory or a storage device of the mobile edge computing platform.

In Example 12, the subject matter of Example 11, wherein the SEC directs a controller of the storage device to encrypt the data.

In Example 13, the subject matter of any of Examples 11-12, wherein the SEC generates a workload specific key as part of the instantiation of the isolated environment, wherein the workload specific key is used for encryption of the data.

In Example 14, the subject matter of any of Examples 10-13, wherein, to prevent access to the data or code, the SEC uses virtual memory mapping to prevent memory access between isolated environments.

In Example 15, the subject matter of any of Examples 10-14, wherein the mobile edge computing platform conforms to a multi-access edge computing (MEC) architecture.

In Example 16, the subject matter of any of Examples 10-15, wherein the workload supports an augmented reality or virtual reality (AR/VR) application of the user device.

In Example 17, the subject matter of any of Examples 10-16, wherein the workload request is routed to the mobile edge platform via a mobile edge orchestrator, the route based on a communications proximity of the user device and the mobile edge platform.

In Example 18, the subject matter of Example 17, wherein the communications proximity corresponds to a wireless coverage of the user device by a transceiver co-located with the mobile edge platform.

Example 19 is at least one machine readable medium including instructions for mobile edge-cloud security, the instructions, when executed by processing circuitry, cause the processing circuitry to perform operations comprising: receiving a workload request from a user device via a network; instantiating the workload in an isolated environment on an edge computing platform, the isolated environment being a container or a virtual machine, the instantiating including using a hardware security component (SEC) of the mobile edge computing platform to prevent access to data or code of the workload from other environments hosted by the mobile edge computing platform; executing the workload in the isolated environment; and returning a result of the workload to the user device.

In Example 20, the subject matter of Example 19, wherein, to prevent access to the data or code, the SEC encrypts data before storing it in memory or a storage device of the mobile edge computing platform.

In Example 21, the subject matter of Example 20, wherein the SEC directs a controller of the storage device to encrypt the data.

In Example 22, the subject matter of any of Examples 20-21, wherein the SEC generates a workload specific key as part of the instantiation of the isolated environment, wherein the workload specific key is used for encryption of the data.

In Example 23, the subject matter of any of Examples 19-22, wherein, to prevent access to the data or code, the SEC uses virtual memory mapping to prevent memory access between isolated environments.

In Example 24, the subject matter of any of Examples 19-23, wherein the mobile edge computing platform conforms to a multi-access edge computing (MEC) architecture.

In Example 25, the subject matter of any of Examples 19-24, wherein the workload supports an augmented reality or virtual reality (AR/VR) application of the user device.

In Example 26, the subject matter of any of Examples 19-25, wherein the workload request is routed to the mobile edge platform via a mobile edge orchestrator, the route based on a communications proximity of the user device and the mobile edge platform.

In Example 27, the subject matter of Example 26, wherein the communications proximity corresponds to a wireless coverage of the user device by a transceiver co-located with the mobile edge platform.

Example 28 is a system for mobile edge-cloud security, the system comprising: means for receiving a workload request from a user device via a network; means for instantiating the workload in an isolated environment on an edge computing platform, the isolated environment being a container or a virtual machine, the instantiating including using a hardware security component (SEC) of the mobile edge computing platform to prevent access to data or code of the workload from other environments hosted by the mobile edge computing platform; means for executing the workload in the isolated environment; and means for returning a result of the workload to the user device.

In Example 29, the subject matter of Example 28, wherein, to prevent access to the data or code, the SEC encrypts data before storing it in memory or a storage device of the mobile edge computing platform.

In Example 30, the subject matter of Example 29, wherein the SEC directs a controller of the storage device to encrypt the data.

In Example 31, the subject matter of any of Examples 29-30, wherein the SEC generates a workload specific key as part of the instantiation of the isolated environment, wherein the workload specific key is used for encryption of the data.

In Example 32, the subject matter of any of Examples 28-31, wherein, to prevent access to the data or code, the SEC uses virtual memory mapping to prevent memory access between isolated environments.

In Example 33, the subject matter of any of Examples 28-32, wherein the mobile edge computing platform conforms to a multi-access edge computing (MEC) architecture.

In Example 34, the subject matter of any of Examples 28-33, wherein the workload supports an augmented reality or virtual reality (AR/VR) application of the user device.

In Example 35, the subject matter of any of Examples 28-34, wherein the workload request is routed to the mobile edge platform via a mobile edge orchestrator, the route based on a communications proximity of the user device and the mobile edge platform.

In Example 36, the subject matter of Example 35, wherein the communications proximity corresponds to a wireless coverage of the user device by a transceiver co-located with the mobile edge platform.

Example 37 is a system for edge-supported an augmented reality (AR) or virtual reality (VR) environment (AR/VR environment), the system comprising: a first user device arranged to: create content for the AR/VR environment; and transmit the content; an orchestrator network device to: intercept transmission of the content from the first user device to a central cloud; and transmit the content to an edge computing platform in an edge cloud; and a second user device to: retrieve the content from the edge computing platform; and render an audio or visual indicator in the AR/VR environment based on the content.

In Example 38, the subject matter of Example 37, wherein the mobile computing platform and the central cloud use a same application programming interface (API) to accept the content and enable retrieval of the content.

Example 39 is at least one machine-readable medium including instructions that, when executed by processing circuitry, cause the processing circuitry to perform operations to implement of any of Examples 37-38.

Example 40 is an apparatus comprising means to implement of any of Examples 37-38.

Example 41 is a system to implement of any of Examples 37-38.

Example 42 is a method to implement of any of Examples 37-38.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it may not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for mobile edge-cloud security, the device comprising:
   a hardware security component (SEC);
   a memory including instructions; and
   processing circuitry that, when in operation, is configured by the instructions to:
      receive a first workload request via a network;
      receive a second workload request via the network;
      instantiate the workload in an isolated environment on an edge computing platform, the isolated environment being a container or a virtual machine, the instantiation using the SEC to prevent access to data or code of the workload from other environments hosted by the edge computing platform, wherein to prevent access to the data or code of the workload, the SEC encrypts the data or code before storing the data or code in memory or on a storage device of the edge computing platform;
      instantiate the second workload in the isolated environment on the edge computing platform, the instantiation of the second workload using the SEC to prevent access to a second data or code of the second workload from at least one of the first workload or the other environments hosted by the edge computing platform, wherein to prevent access to the second data or code of the second workload, the SEC encrypts the second data or code before storing the second data or code in the memory or on the storage device of the edge computing platform;
      execute at least one of the first workload or the second workload in the isolated environment; and
      return a result of at least one of the first workload or the second workload;
   wherein the SEC generates a first workload specific key and a second workload specific key as part of the instantiation of the isolated environment, wherein the first workload specific key is used for encryption of the data or code, and the second workload specific key is used for encryption of the second data or code.

2. The device of claim 1, wherein the SEC directs a controller of the storage device to encrypt at least one of the data or code or the second data or code.

3. The device of claim 1, wherein, to prevent access to the data or code and the second data or code, the SEC uses virtual memory mapping to prevent memory access between isolated environments.

4. The device of claim 1, wherein at least one of the workload or the second workload supports an augmented reality or virtual reality (AR/VR) application of a user device.

5. The device of claim 1, wherein at least one of the workload request or the second workload request is routed to the edge computing platform via a edge orchestrator, the route based on a communications proximity of a user device and the edge platform.

6. The device of claim 5, wherein the communications proximity corresponds to a wireless coverage of the user device by a transceiver co-located with the edge computing platform.

7. The device of claim 1, wherein the workload request is provided from a first user device.

8. The device of claim 1, wherein the second workload request is provided from a second user device.

9. A method for edge-cloud security, the method comprising:
   receiving a first workload request via a network;
   receiving a second workload request via the network;
   instantiating the workload in an isolated environment on an edge computing platform, the isolated environment being a container or a virtual machine, the instantiating including using a hardware security component (SEC) of the edge computing platform to prevent access to data or code of the workload from other environments hosted by the edge computing platform, wherein to prevent access to the data or code of the workload, the SEC encrypts the data or code before storing the data or code in memory or on a storage device of the edge computing platform;
   instantiating the second workload in the isolated environment on the edge computing platform, the instantiation of the second workload using the SEC to prevent access to a second data or code of the second workload from at least one of the first workload or the other environments hosted by the edge computing platform, wherein to prevent access to the second data or code of the second workload, the SEC encrypts the second data or code before storing the second data or code in the memory or on the storage device of the edge computing platform;
   executing at least one of the first workload or the second workload in the isolated environment; and
   returning a result of at least one of the first workload or the second workload;
   wherein the SEC generates a first workload specific key and a second workload specific key as a part of the instantiation of the isolated environment, wherein the first workload specific key is used for encryption of the data or code, and the second workload specific key is used for encryption of the second data or code.

10. The method of claim 9, wherein the SEC directs a controller of the storage device to encrypt the data or code or the second data or code.

11. The method of claim 9, wherein, to prevent access to the data or code and the second data or code, the SEC uses virtual memory mapping to prevent memory access between isolated environments.

12. The method of claim 9, wherein at least one of the workload or the second workload supports an augmented reality or virtual reality (AR/VR) application of a user device.

13. The method of claim 9, wherein at least one of the workload request or the second workload request is routed to the edge computing platform via a edge orchestrator, the route based on a communications proximity of a user device and the edge computing platform.

14. The method of claim 13, wherein the communications proximity corresponds to a wireless coverage of the user device by a transceiver co-located with the edge computing platform.

15. The method of claim 9, wherein the workload request is provided from a first user device.

16. The method of claim 9, wherein the second workload request is provided from a second user device.

17. At least one non-transitory machine readable medium including instructions for edge-cloud security, the instructions, when executed by processing circuitry, cause the processing circuitry to perform operations comprising:
    receiving a first workload request via a network;
    receiving a second workload request via the network;
    instantiating the workload in an isolated environment on an edge computing platform, the isolated environment being a container or a virtual machine, the instantiating including using a hardware security component (SEC) of the edge computing platform to prevent access to data or code of the workload from other environments hosted by the edge computing platform, wherein to prevent access to the data or code of the workload, the SEC encrypts the data or code before storing the data or code in memory or on a storage device of the edge computing platform;
    instantiating the second workload in the isolated environment on the edge computing platform, the instantiation of the second workload using the SEC to prevent access to a second data or code of the second workload from at least one of the first workload or the other environments hosted by the edge computing platform, wherein to prevent access to the second data or code of the second workload, the SEC encrypts the second data or code before storing the second data or code in the memory or on the storage device of the edge computing platform;
    executing at least one of the first workload or the second workload in the isolated environment; and
    returning a result of at least one of the first workload or the second workload;
    wherein the SEC generates a first workload specific key and a second workload specific key as a part of the instantiation of the isolated environment, wherein the first workload specific key is used for encryption of the data or code, and the second workload specific key is used for encryption of the second data or code.

18. The at least one machine readable medium of claim 17, wherein the SEC directs a controller of the storage device to encrypt at least one of the data or code or the second data or code.

19. The at least one machine readable medium of claim 17, wherein, to prevent access to the data or code and the second data or code, the SEC uses virtual memory mapping to prevent memory access between isolated environments.

20. The at least one machine readable medium of claim 17, wherein at least one of the workload or the second workload supports an augmented reality or virtual reality (AR/VR) application of a user device.

21. The at least one machine readable medium of claim 17, wherein at least one of the workload request or the second workload request is routed to the edge computing platform via an edge orchestrator, the route based on a communications proximity of a user device and the edge computing platform.

22. The at least one machine readable medium of claim 21, wherein the communications proximity corresponds to a wireless coverage of the user device by a transceiver co-located with the edge computing platform.

23. The at least one machine readable medium of claim 17, wherein the workload request is provided from a first user device.

24. The at least one machine readable medium of claim 17, wherein the second workload request is provided from a second user device.

* * * * *